United States Patent
Appelo

(10) Patent No.: US 10,343,098 B2
(45) Date of Patent: *Jul. 9, 2019

(54) CLEANING VALVE WITH DAMPENING MECHANISM

(71) Applicant: General Electric Technology GmbH, Baden (CH)

(72) Inventor: Per-Erik Albert Appelo, Knoxville, TN (US)

(73) Assignee: General Electric Company, Schenectady, NY (US)

( * ) Notice: Subject to any disclaimer, the term of this patent is extended or adjusted under 35 U.S.C. 154(b) by 517 days.

This patent is subject to a terminal disclaimer.

(21) Appl. No.: 13/892,683

(22) Filed: May 13, 2013

(65) Prior Publication Data

US 2014/0332038 A1   Nov. 13, 2014

(51) Int. Cl.
   *B01D 46/04*   (2006.01)
   *F16K 47/02*   (2006.01)
   *F16K 15/02*   (2006.01)

(52) U.S. Cl.
   CPC .............. *B01D 46/04* (2013.01); *F16K 15/02* (2013.01); *F16K 15/025* (2013.01); *F16K 47/02* (2013.01)

(58) Field of Classification Search
   None
   See application file for complete search history.

(56) References Cited

U.S. PATENT DOCUMENTS

| | | |
|---|---|---|
| 865,479 A | 9/1907 | Cooper |
| 914,886 A | 3/1909 | Schreidt |
| 926,400 A | 6/1909 | Freaney |
| 1,548,093 A | 8/1925 | McCormick et al. |
| 2,476,400 A | 7/1949 | Berkholder |
| 2,541,176 A | 2/1951 | Rockwell |
| 3,253,615 A | 5/1966 | Armstrong |
| 3,446,473 A | 5/1969 | Barker |
| 4,190,230 A * | 2/1980 | Geissbuhler ....... B01D 46/0068 251/30.02 |
| 4,198,029 A | 4/1980 | Johnson |
| 4,760,865 A | 8/1988 | Rilett |
| 4,793,589 A | 12/1988 | Eldredge et al. |

(Continued)

FOREIGN PATENT DOCUMENTS

| | | |
|---|---|---|
| CN | 2191330 Y | 3/1995 |
| CN | 200961711 Y | 10/2007 |

(Continued)

OTHER PUBLICATIONS

English Machine Translation of CN-101293158-A.*

(Continued)

*Primary Examiner* — Mikhail Kornakov
*Assistant Examiner* — Pradhuman Parihar
(74) *Attorney, Agent, or Firm* — Frank A. Landgraff

(57) ABSTRACT

Pulse valves and methods of using pulse valves are provided. The pulse valves include a dampening mechanism to decrease mechanical stresses, decrease operating noise, decrease compressed air waste and increase operational life expectancy. Such dampening mechanism is arranged within an internal area of the pulse valve housing. Additionally, fluid within the internal area of the pulse valve provides cushioning effects during operation of the pulse valve.

10 Claims, 2 Drawing Sheets

(56) References Cited

U.S. PATENT DOCUMENTS

| | | | |
|---|---|---|---|
| 5,002,594 | A | 3/1991 | Merritt |
| 5,042,775 | A | 8/1991 | Willemsen |
| 5,178,652 | A | 1/1993 | Huttlin |
| 5,533,706 | A * | 7/1996 | Aurell .................. 251/44 |
| 5,657,790 | A | 8/1997 | Mohn |
| 5,887,973 | A | 3/1999 | Ahman et al. |
| 7,204,211 | B2 | 4/2007 | Kenchington et al. |
| 2005/0210842 | A1 | 9/2005 | McCausland |
| 2006/0123753 | A1 | 6/2006 | Sugiura et al. |
| 2008/0022641 | A1 | 1/2008 | Engelland et al. |
| 2010/0108927 | A1 | 5/2010 | Perz et al. |
| 2011/0000174 | A1 | 1/2011 | Kapelarie et al. |
| 2011/0206572 | A1 * | 8/2011 | McKenna et al. ........... 422/211 |
| 2012/0073251 | A1 | 3/2012 | Troxell et al. |
| 2012/0138104 | A1 * | 6/2012 | Haynam et al. ............ 134/33 |
| 2013/0153039 | A1 | 6/2013 | Deubler |
| 2014/0318087 | A1 | 10/2014 | Hjelmberg et al. |
| 2014/0332039 | A1 * | 11/2014 | Appelo ................ B01D 46/04 |
| | | | 134/37 |
| 2014/0332702 | A1 | 11/2014 | Hjelmberg et al. |
| 2016/0076665 | A1 | 3/2016 | Appelo |

FOREIGN PATENT DOCUMENTS

| | | | |
|---|---|---|---|
| CN | 101293158 A | * | 10/2008 |
| CN | 101293158 A | | 10/2008 |
| CN | 201462062 U | | 5/2010 |
| CN | 101879395 A | | 11/2010 |
| CN | 202158221 U | | 3/2012 |
| CN | 102705529 A | | 10/2012 |
| CN | 202460368 U | | 10/2012 |
| EP | 0651187 A1 | | 5/1995 |
| EP | 1 085 244 A2 | | 3/2001 |
| EP | 1 493 480 A1 | | 1/2005 |
| EP | 2 390 539 A1 | | 11/2011 |
| EP | 2390539 | * | 11/2011 ............ F16K 3/24 |
| FR | 2 652 631 A1 | | 4/1991 |
| WO | 91/19922 A1 | | 12/1991 |
| WO | 97/18026 A1 | | 5/1997 |
| WO | 01/29465 A1 | | 4/2001 |
| WO | 2013138092 A2 | | 9/2013 |

OTHER PUBLICATIONS

English Machine Translation of CN-101293158-A; Oct 2008.*
Trimec Dust Filters Components: SPV High Efficiency Sonic Piston Valve, 2010, pp. 1-4, Trimec S.r.l.—Via Gramsci, 57-20032 Cormaho (Milano)—Italy. www.trimecvalves.com.
European Search Report dated Oct. 28, 2014 for EP Appln. No. 14166188.4.
Office action issued from Chinese Patent Office dated Jan. 4, 2016 for CN Application No. 201410199840.5.
Solenoid Diaphragm Valves for Bag House (HJ/T284-2006), State Environmental Protection Administration, Jul. 28, 2007, pp. 1-11.
Extended European Search Report and Opinion issued in connection with related EP Application No. 12154678.2 dated Jul. 5, 2012.
International Search Report and Written Opinion issued in connection with related PCT Application No. PCT/IB2013/050842 dated May 24, 2013.
Unofficial English translation of First Office Action and Search Report issued in connection with related CN Application No. 201380008903.8 dated Apr. 5, 2015.
Non-Final Rejection towards related U.S. Appl. No. 14/328,029 dated May 13, 2015.
Final Rejection towards related U.S. Appl. No. 13/892,938 dated May 15, 2015.
Patent Examination Report No. 1 issued in connection with related AU Application No. 2013217250 dated May 27, 2015.
First Office Action issued in connection with related CN Application No. 20140199023.X dated Dec. 31, 2015.
First Office Action and Search Report issued in connection with related CN Application No. 201410199937.6 dated Dec. 31, 2015.
Second Office Action and Supplementary Search issued in connection with related CN Application No. 201410199840.5 dated Aug. 11, 2016.
Final Rejection towards related U.S. Appl. No. 13/892,774 dated Sep. 14, 2016.
U.S. Final Office Action issued in connection with related U.S. Appl. No. 14/850,208 dated May 22, 2017.
"Goyen CP Series—Close Pitched Valve", Aluminium Body X-Spool, Rev. 01, Apr. 2015.
"Goyen CP Series—Close Pitched Valve", Manifold System, Rev. 01, Apr. 2015.
European Search Report and Written Opinion issued in connection with related EP Application No. 15183812.5-1751 dated Mar. 3, 2016.
Non-Final Rejection towards related U.S. Appl. No. 14/850,208 dated Dec. 9, 2016.
Non-Final Rejection towards related U.S. Appl. No. 14/488,642 dated Mar. 1, 2017.
Machine translation and a Third Office Action and Search issued in connection with corresponding CN Application No. 201410199840.5 dated Aug. 9, 2017.
U.S. Appl. No. 15/353,097, filed Nov. 16, 2016.
Office Action issued in connection with corresponding EP Application no. 14166188.4 dated Dec. 11, 2018.

* cited by examiner

CLEANING VALVE WITH DAMPENING MECHANISM

FIELD OF THE INVENTION

In general, the present disclosure relates to a cleaning valve useful for cleaning at least a portion of a filter unit, such as filter bags, arranged in a filter installation useful for filtering polluted gas passed therethrough. More specifically, the present disclosure relates to a cleaning valve with a dampening mechanism that enables increased tank pressure for increased filter area cleaning per cleaning valve without jeopardizing cleaning valve reliability.

BACKGROUND OF THE INVENTION

Commercial "bag house" type filter installations typically consist of a plurality of parallel filter units, each containing a plurality of parallel rows of vertically arranged filter elements in the form of filter bags. Each such filter bag has a top end opening. A gas polluted with particulates is channeled through the filter installation's filter units to filter and collect the particulates entrained in the gas. By filtering and collecting the particulates entrained in the gas, a cleaned gas is produced. More specifically, a cleaned gas is produced by channeling polluted gas into a filter installation for passage through one or more filter units arranged for gas flow from an exterior surface of a plurality of filter bags through to an interior area within the filter bags via gas movement through the sides of the filter bags. In passing from an exterior surface of the filter bags through to an interior area within the filter bags, particulate pollutants carried by the gas become trapped on the exterior surface of the filter bag. Hence, gas in the interior area of the filter bags is the so produced "cleaned gas". Cleaned gas exits the interior areas of the filter bags via a top end opening formed in a top of each such filter bag. As such, cleaned gas flows from the top end openings through an outlet duct common to the filter units.

During operation of the filter installation, a negative pressure is typically generated by a fan arranged downstream of the filter installation causing gas flow through the filter units and filter bags. As the gas passes through the sides of the plurality of filter bags, the gas is cleaned as dust and particulates entrained in the gas deposit on the exterior surfaces of the filter bags forming a dust cake. Cleaning of the filter bags to remove dust cakes is necessary for effective equipment operation and performance.

Cleaning of the filter bags is accomplished using a pressure medium in the form of compressed air pulses injected into the filter bags in a direction opposite to that of gas filtering. The rows of filter bags are cleaned successively using compressed air pulses generated and transmitted at the same time to all filter bags in a given row. Such is accomplished by means of a cleaning unit arranged for successively cleaning each individual row of filter bags. Each cleaning unit comprises a nozzle pipe arranged above and extending along the length of the associated row of filter bags parallel thereto for cleaning thereof. Each nozzle pipe also includes a distribution pipe with a plurality of vertically downwardly projecting pipe sockets connected thereto with each individual pipe socket positioned straight above a filter bag top end opening in the row. The function of these pipe sockets is to direct via nozzles compressed air pulses into each of the respective filter bag top end openings. The pipe sockets usually have a diameter of about 1.5 to 2 times greater than the diameter of the nozzle associated therewith. The nozzles associated therewith consist of circular holes of varying diameter formed in the distribution pipe. The varying diameters of the circular holes in the distribution pipe are determined empirically based on the total number of pipe sockets/nozzles along the length of the distribution pipe requiring a uniform distribution of compressed air pulsed therethrough. As such, circular holes arranged in the distribution pipe a greater distance from the nozzle pipe are larger in diameter than those of circular holes arranged in the distribution pipe a lesser distance from the nozzle pipe. By so varying the diameter of the circular holes, a uniform distribution of compressed air pulsed therethrough is achieved.

In the cleaning of filter bags using a pulse of compressed air, a valve is temporarily opened to establish a connection between a compressed air tank and the nozzle pipe to transmit a compressed air pulse through the nozzle pipe and its associated distribution pipe, pipe sockets and nozzles. As such, a single compressed air pulse is supplied to each of the filter bags in a row relatively simultaneously. Nozzle pipes as described above are thus used to effectively and efficiently clean individual rows of filter bags with compressed air pulses. In cleaning, compressed air pulses dislodge dust and particulates that collect and cake in and on the walls of the filter bags. Dust cakes that form on the filter bags are thereby loosened by the compressed air pulse moving from the interior area of the filter bags, through the filter bag side walls and out of the filter bags to an area in the filter unit exterior thereto. The resultant loosened dust cakes fall off the exterior of the filter bags for hopper collection.

In operating a cleaning unit, it is essential that the above-described pulse valve delivers a cleaning pulse of compressed air at a relatively high pressure with a relatively low consumption of compressed air. Pulse valves function by a cavity behind a plunge or membrane emptying through either a solenoid valve or a pilot valve, whereby the plunge or membrane is displaced with rapid acceleration due to the differential pressure between an air tank pressure on one side of the plunge or membrane and the cavity pressure on the other side of the plunge or membrane. The plunge or membrane is displaced with considerable velocity as a result of the pressure differential and eventually hits an end position with very high momentum. The plunge or membrane hitting the end position with very high momentum creates a significantly loud noise upon impact. Likewise, when the plunge or membrane hits the end position, the impact thereof creates relatively high mechanical stresses. Mechanical stresses on the valve shorten the operational life expectancy of the valve and add to the system's operation costs when performance is hampered and/or replacement is necessary. Further, the plunge or membrane typically bounces with several pressure peaks upon hitting the end position causing compressed air waste. Hence, to increase system performance and decrease system operational costs, a valve with decreased mechanical stresses, decreased operational noise, decreased compressed air waste and increased operational life expectancy is desired.

SUMMARY OF THE INVENTION

In view of the above, the present device is a pulse valve and a method of using the pulse valve for effective pulsed compressed air cleaning of a plurality of filter elements, such as filter bags, with decreased valve mechanical stresses, decreased valve operational noise, decreased compressed air waste and increased valve operational life expectancy. As such, a first embodiment of the subject pulse valve device useful for pulsed compressed air cleaning of at least a portion of a filter unit comprises a housing with a plunge slideably positioned therein. The housing is arranged in an opening of a pressure vessel, or compressed air tank, containing compressed air having a pressure of about 10 pounds per square inch (psi) to about 100 psi, or about 60 psi. A plurality of openings is formed in the housing for the flow of compressed air from the pressure vessel through the housing and into a nozzle pipe. Compressed air flows through the nozzle pipe for effective cleaning at least a portion of a filter unit when the plunge is in a first position, or "open" position.

A fluid supply fluidly connected to or on the housing for supply of a fluid to an interior area or cavity within the housing causes displacement or movement of the plunge to a second position, or "closed" position. When in the second position, the plunge blocks the plurality of openings in the housing and thus blocks the flow of compressed air from the pressure vessel or compressed air tank to the nozzle pipe.

Compressed air in the pressure vessel or compressed air tank has a pressure of about 10 psi to about 100 psi, or about 60 psi. When the plunge is in the first position, the fluid pressure within the interior area or cavity of the housing is significantly less than that of the compressed air within the pressure vessel. When the plunge is in the second position, the fluid pressure within the interior area or cavity of the housing is significantly greater than that of the compressed air within the pressure vessel.

A dampening mechanism, such as cushions, is arranged inside the pulse valve housing to reduce or dampen the impact between the housing and the plunge upon movement of the plunge into the first position. The internal dampening mechanism likewise reduces the impact noise of the plunge upon movement of the plunge into the first position. In addition to the dampening mechanism, fluid within the interior area or cavity of the housing provides a cushioning effect that reduces impact and impact noise of the plunge upon displacement or movement thereof into the first position.

To prevent the plunge within the pulse valve from "sticking" in the first position, the subject pulse valve may optionally include a spring member arranged in the interior area of the housing between the housing and the plunge to assist movement of the plunge into the second position upon the requisite change in pressure differential between that of the compressed air tank and the housing interior area.

Another embodiment of the subject pulse valve includes a membrane extending between the plunge and the housing to fluidly separate or seal the valve interior area from that of the compressed air tank.

The subject pulse valve devices also include a solenoid valve or the like associated with the housing for control of fluid flow to the interior area of the housing. This control of fluid flow controls the pressure differential between the housing interior area and the compressed air tank, thus controlling movement of the plunge for the cleaning of filter bags using compressed air pulses.

A method of using the subject pulse valve device for cleaning at least a portion of a filter unit comprises reducing fluid pressure within an interior area or cavity of a valve housing to cause pressure differential movement of a plunge into a first position allowing flow of compressed air from a pressure vessel or compressed air tank through a nozzle pipe in fluid connection with a filter unit thereby cleaning the filter unit with a pulse of compressed air. Increasing fluid pressure within an interior area or cavity of the valve housing likewise causes pressure differential movement of the plunge into a second position blocking flow of compressed air from the pressure vessel or compressed air tank and hence from the nozzle pipe until a further pulse cleaning of the filter unit is indicated by buildup of a dust cake.

For purposes of this method, the compressed air in the pressure vessel has a pressure of about 10 psi to about 100 psi, or about 60 psi. When the plunge is in the first position, the fluid pressure within the interior area of the housing is significantly less than that of the compressed air within the pressure vessel or compressed air tank. When the plunge is in the second position, the fluid pressure within the interior area of the housing is significantly greater than that of the compressed air within the pressure vessel. Pressure within the housing is controlled using a solenoid valve or the like for purposes of the subject method to control fluid flow to the interior area of the housing to thus control the pressure differential between that of the interior area and that of the compressed air tank.

The subject method further comprises providing a dampening mechanism within the housing to reduce or cushion the impact between the housing and the plunge upon movement of the plunge into the first position. Providing a dampening mechanism as herein described also reduces the impact noise of the plunge with the housing upon movement of the plunge into the first position. Fluid within the interior area of the housing likewise provides a cushioning effect to reduce impact and impact noise of the plunge upon movement of the plunge into the first position.

Optionally, a spring member may be used in the subject method by arranging the spring in the interior area of the housing between the housing and the plunge to assist movement of the plunge into the second position. Optionally, the subject method may likewise use a membrane to fluidly seal the housing interior area apart from the pressure vessel by fixing the membrane to extend between the plunge and the interior area of the housing.

The subject pulse valve device and method for using the same to clean at least a portion of a filter unit, such as filter bags, arranged in a filter installation to filter polluted gas passed therethrough includes among other features noted, a dampening mechanism that enables increased tank pressure for increased filter area cleaning per cleaning valve without jeopardizing cleaning valve reliability.

BRIEF DESCRIPTION OF THE DRAWINGS

Embodiments according to the present invention will now be described in more detail with reference to the accompanying drawings, in which.

DETAILED DESCRIPTION

Figure 1:
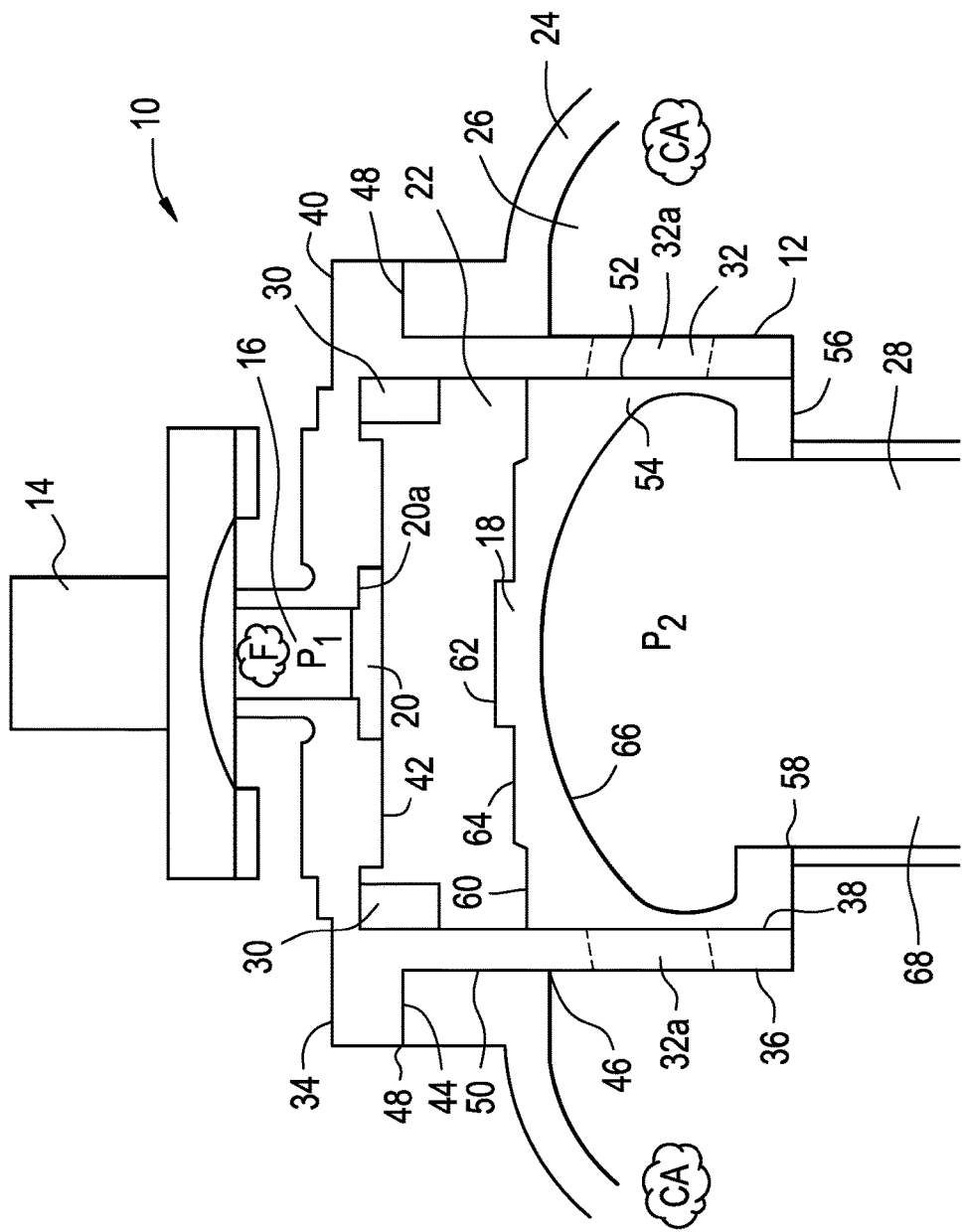
FIG. 1 is a side cross-sectional view of a pulse valve device according to the present invention.

Pulse valves useful for effective compressed air pulsed cleaning of a plurality of filter elements, such as filter bags, with decreased valve mechanical stresses, decreased valve operational noise, decreased compressed air waste and increased valve operational life expectancy are described herein. As best illustrated in FIG. 1, a first embodiment of the subject valve device 10 comprises a plunge valve housing 12. Plunge valve housing 12 is manufactured of a sturdy natural, e.g., iron, aluminum, or other metal, or synthetic, e.g., plastic, resin or other polymer, material suitably rigid and durable for robust industrial uses and forces. Plunge valve housing 12 is formed with sides 32 having openings 32a, unitarily formed with or securely attached to a top 34. Sides 32 include an exterior surface 36 and an interior surface 38. Top 34 includes an exterior surface 40 and an interior surface 42. At the juncture of interior surface 38 and interior surface 42 is a dampening mechanism or cushion 30. Cushion 30 may be manufactured from natural or synthetic rubber, silicone or a like flexible material capable of providing cushioning effects upon repeated impact between solid surfaces. Top 34 extends outwardly beyond exterior surface 36 to form a lip 44. As such, housing 12 is positioned within an opening 46 of a pressure vessel 24 with lip 44 abutting extended edge 48 of opening 46 with at least a portion of exterior surface 36 in contact with surface 50 of opening 46 for an airtight seal therebetween. In interior area 26 of pressure vessel 24 is compressed air "CA".

Slideably positioned within interior area 22 of housing 12 is a plunge 18. Plunge 18 is likewise manufactured of a sturdy natural, e.g., iron, aluminum, or other metal, or synthetic, e.g., plastic, resin or other polymer, material suitably rigid and durable for robust industrial uses and forces. Exterior surfaces 52 of sides 54 of plunge 18 contacts interior surfaces 38 of sides 32 of housing 12 for an air tight seal therebetween. Free ends 56 of sides 54 abut ends 58 of pulse pipe 28 for an air tight seal therebetween. Extending between sides 54 of plunge 18 opposite free ends 56, is a top 60 with a plug portion 62 on an exterior surface 64 thereof. Opposite exterior surface 64 is interior surface 66. Interior surface 66 of plunge 18 is in fluid communication with interior 68 of nozzle pipe 28. Between exterior surface 64 of plunge 18 and interior surface 42 of top 34 of housing 12 is interior area 22. The area "A" of interior area 22 varies as plunger 18 moves or slides within housing 12. The area A of interior area 22 is minimized when top 60 of plunge 18 moves inwardly within housing 12 to contact interior surface 42 of top 34 of housing 12. In this first or "open" position, top 60 contacts pliable dampening mechanisms 30 and plug portion 62 fits into opening 20 to abut sealing seat 20a of housing 12 to block fluid "F" from flowing from cavity 16 of solenoid valve 14 integrally formed with or securely affixed to housing 12. In this first or "open position, compressed air CA flows from interior area 26 of pressure vessel 24 through openings 32a and into nozzle pipe 28.

Figure 2:
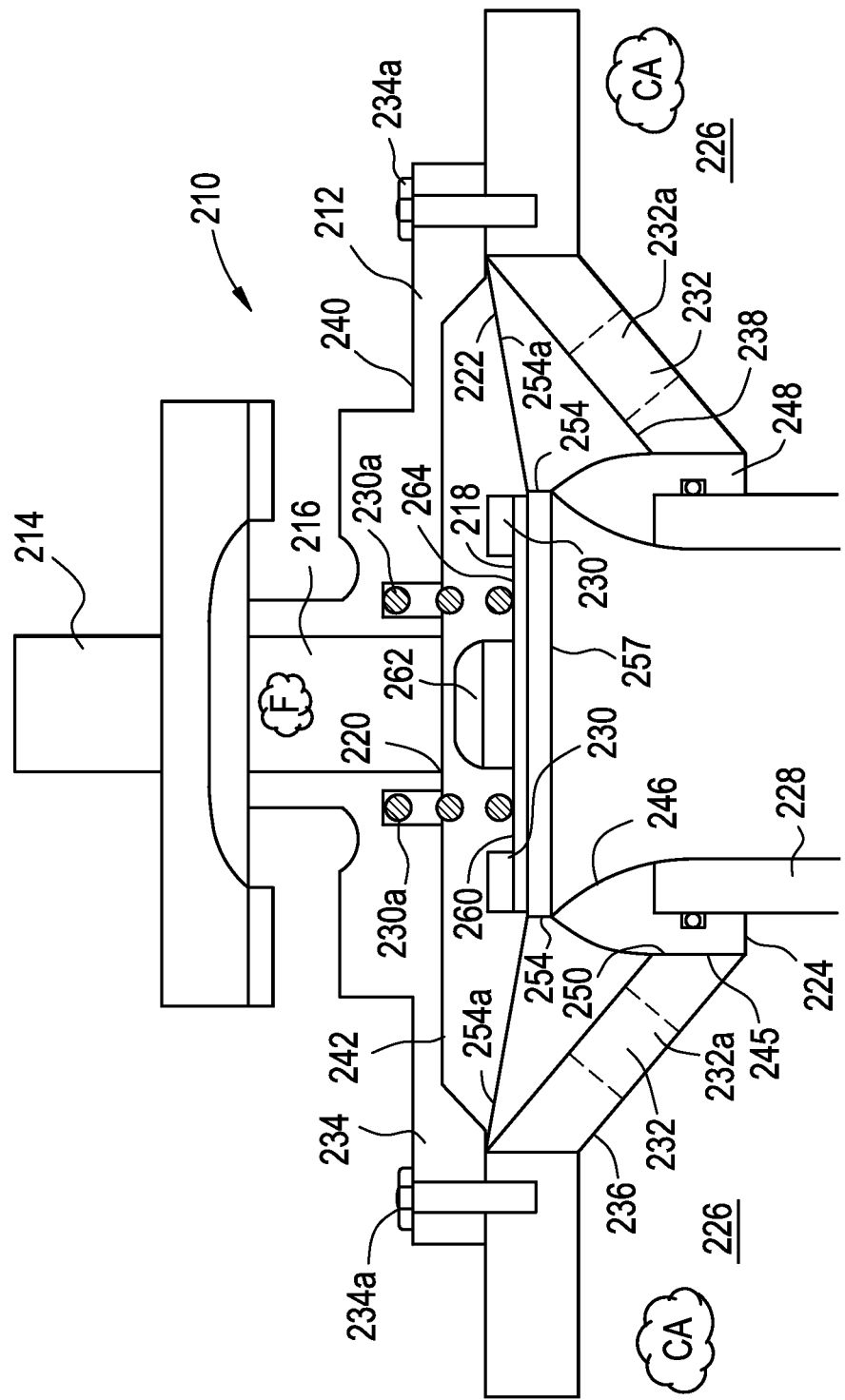
FIG. 2 is a side cross-sectional view of another embodiment of a pulse valve device according to the present invention.

Another embodiment of the subject pulse valve device 210 is best illustrated in FIG. 2. Pulse valve device 210 has features in common with those of pulse valve device 10 illustrated in FIG. 1. As such, features illustrated in FIG. 2 common to those of FIG. 1 are signified using the same reference numbers but with the number "2" preceding them. As illustrated in FIG. 2, pulse valve device 210 comprises a housing 212. Housing 212 is manufactured of a sturdy natural, e.g., iron, aluminum, or other metal, or synthetic, e.g., plastic, resin or other polymer, material suitably rigid and durable for robust industrial uses and forces. Housing 212 is formed with sides 232 unitarily formed with or securely attached to a top 234. In FIG. 2, top 234 is illustrated as securely attached to sides 232 by means of screws 234a. Sides 232 include an exterior surface 236 and an interior surface 238. Top 234 includes an exterior surface 240 and an interior surface 242. Housing 212 is positioned on an opening 246 of a pressure vessel 224 with a free edge 245 abutting extended edge 248 of opening 246 and a portion of free edge 245 in contact with surface 250 of opening 246 for an airtight seal therebetween. In interior area 226 of pressure vessel 224 is compressed air "CA".

Movably positioned within interior area 222 of housing 212 is a plunge 218. Plunge 218 is likewise manufactured of a sturdy natural, e.g., iron, aluminum, or other metal, or synthetic, e.g., plastic, resin or other polymer, material suitably rigid and durable for robust industrial uses and forces. Sides 254 of plunge 218 are securely fixed to a membrane 254a. Membrane 254a is securely fixed between sides 254 of plunge 218 and housing 212 at the point of attachment between top 234 and sides 232 for an air tight seal between interior area 222 and interior area 226 of pressure vessel 224. Interior surface 257 of plunge 218 abuts pressure vessel 224 at opening 246. Also fixed at opening 246 of pressure vessel 224 is nozzle pipe 228 with an air tight seal therebetween. Extending between sides 254 of plunge 218 opposite interior surface 257 is a top 260 with a plug portion 262 on an exterior surface 264 thereof. Exterior surface 264 of top 260 includes one or more dampening mechanisms or cushions 230. Cushions 230 may be manufactured from natural or synthetic rubber, silicone or a like flexible material capable of providing cushioning effects upon repeated impact between solid surfaces. Between exterior surface 264 of plunge 218 and interior surface 242 of top 234 of housing 212 is interior area 222. The area "A" of interior area 222 varies as pilot plunger 218 moves within housing 212. The area A of interior area 222 is minimized when top 260 of plunge 218 moves inwardly in housing 212 to contact interior surface 242 of top 234 of housing 212. In this first or "open" position, plug portion 262 contacts pliable cushions 230 and plug portion 262 sized to fit into opening 220 of housing 212 blocks fluid flow from cavity 216 of solenoid valve 214 integrally formed with or securely affixed to housing 212. In this first or open position, the compressed air pressure inside interior area 226 of pressure vessel 224 is greater than the fluid pressure inside interior area 222. When the subject pulse valve is in this first position, interior surface 257 of plunge 218 is distanced apart from opening 246 allowing compressed air to flow from interior area 226 through the openings 232a in sides 232 through opening 246 and into nozzle pipe 228. To aid plunge 218 movement into the second or "closed" position, is a spring member 230a. Spring member 230a likewise dampens or cushions the impact and resultant impact noise of plunge 218 against interior surface 242 of housing 212.

The area A of interior area 222 is maximized when top 260 of plunge 218 moves outwardly from housing 212 for contact of exterior surface 257 of plunge 218 over opening 246 of pressure vessel 224. In this second or "closed" position, plunge 218 blocks compressed air flow from flowing through opening 246. Likewise, plug portion 262 moves a distance away from opening 220 of housing 212 to allow fluid flow from cavity 216 of solenoid valve 214 to internal area 222 of housing 212. In this second or closed position, the compressed air pressure inside interior area 226 of pressure vessel 224 is less than that of the fluid pressure inside interior area 222. When the subject pulse valve is in this second position, interior surface 257 of plunge 218 is blocks opening 246 preventing compressed air from flowing from interior area 226 through the openings 232a in sides 232 through opening 246 and into nozzle pipe 228.

A method of using the subject pulse valve device 10, 210 for cleaning at least a portion of a filter unit comprises reducing fluid pressure within an interior area or cavity 22, 222 of a valve housing 12, 212 to cause pressure differential movement of a plunge 18, 218 into a first position allowing flow of compressed air CA from a pressure vessel or compressed air tank 24, 224 through a nozzle pipe 28, 228 in fluid connection with a filter unit thereby cleaning the filter unit with a pulse of compressed air CA. Increasing fluid pressure within an interior area or cavity 22, 222 of the valve housing 12, 212 likewise causes pressure differential movement of the plunge 18, 218 into a second position blocking flow of compressed air CA from the pressure vessel or compressed air tank 24, 224 and hence from the nozzle pipe 28, 228 until a further pulse cleaning of the filter unit is indicated by buildup of a dust cake.

For purposes of this method, the compressed air CA in the pressure vessel 24, 224 has a pressure of about 10 psi to about 100 psi, or about 60 psi. When the plunge 18, 218 is in the first position, the fluid pressure within the interior area 22, 222 of the housing 12, 212 is significantly less than that of the compressed air CA within the pressure vessel or compressed air tank 24, 224. When the plunge 18, 218 is in the second position, the fluid pressure within the interior area 22, 222 of the housing 12, 212 is significantly greater than that of the compressed air CA within the pressure vessel 24, 224. Pressure within the housing 12, 212 is controlled using a solenoid valve 14, 214 or the like for purposes of the subject method to control fluid flow to the interior area 22, 222 of the housing 12, 212 to thus control the pressure differential between that of the interior area 22, 222 and that of the interior area 26, 226 of the compressed air tank 24, 224.

The subject method further comprises providing a dampening mechanism 30, 230 within the housing 12, 212 to reduce or cushion the impact between the housing 12, 212 and the plunge 18, 218 upon movement of the plunge 18, 218 into the first position. Providing a dampening mechanism 30, 230 as herein described also reduces the impact noise of the plunge 18, 218 with the housing 12, 212 upon movement of the plunge 18, 218 into the first position. Additionally, dampening mechanism 30, 230 enables the use of an increased tank pressure for increased filter area cleaning per cleaning valve without jeopardizing cleaning valve reliability. Without dampening mechanism 30, 230, increased tank pressure jeopardizes cleaning valve reliability due to damage or wear caused by increased mechanical stresses from the resultant higher velocity impact of the plunge 18, 218 with the housing 12, 212. Dampening mechanism 30, 230 cushions the impact of plunge 18, 218 with housing 12, 212 thus lessening mechanical stresses of such impacts and reducing damage or wear to the cleaning valve. Hence, with dampening mechanism 30, 230, cleaning valve reliability is not jeopardized with increased tank pressure.

Fluid "F" within the interior area 22, 222 of the housing 12, 212 likewise provides a cushioning effect to reduce impact and impact noise of the plunge 18, 218 upon movement of the plunge 18, 218 into the first position.

Optionally, a spring member 230*a* may be used in the subject method by arranging the spring member 230*a* in the interior area 22, 222 of the housing 12, 212 between the housing 12, 212 and the plunge 18, 218 to assist movement of the plunge 18, 218 into the second position. Optionally, the subject method may likewise use a membrane 254*a* to fluidly seal the housing 12, 212 interior area 22, 222 apart from the interior area 26, 226 of the pressure vessel 24, 224 by fixing the membrane 254*a* to extend between the plunge 18, 218 and interior surfaces 38, 42, 238, 242 of the housing 12, 212.

While preferred embodiments have been shown and described, various modifications and substitutions may be made thereto without departing from the spirit and scope of the invention. Accordingly, it is to be understood that the present invention has been described by way of illustration and not limitation

I claim:

1. A valve device for pulsed compressed air cleaning of a filter unit comprising:
   a housing comprising a housing top, housing sides, and an interior area, the housing arranged in an opening of a pressure vessel containing compressed air;
   the housing top comprising a top opening with a sealing seat;
   a plunge comprising a top, elongated sides extending from the top parallel with and slidably abutting the housing sides, the elongated sides having free ends opposite the top for pulse pipe contact, and a plug portion extending from a center of the top sized to fit within the top opening to abut the sealing seat, the plunge slidably positioned within the interior area of the housing;
   a plurality of openings through the housing sides for the flow of compressed air from the pressure vessel through the housing to the pulse pipe useful for cleaning at least a portion of the filter unit when the plunge is in a first position with the plug portion arranged within the top opening of the housing;
   a fluid supply on the housing for supply of a fluid to an interior area within the housing to cause movement of the plunge to a second position with the plug portion arranged out of the top opening of the housing for blocking by plunge sides of the plurality of openings through the housing sides and blocking the flow of compressed air from the pressure vessel through the plurality of openings to the pulse pipe; and
   a dampening mechanism to cushion impact of the plunge with the housing upon plunge movement into the first position.

2. The valve device of claim 1, further comprising a cavity adjoining the top opening and the sealing seat.

3. The valve device of claim 1, wherein when the plunge is in the first position, the fluid pressure within the interior area of the housing is less than that of the compressed air within the pressure vessel.

4. The valve device of claim 1, wherein when the plunge is in the second position, the fluid pressure within the interior area of the housing is greater than that of the compressed air within the pressure vessel.

5. The valve device of claim 1, wherein the dampening mechanism comprises one or more cushions to reduce impact between the housing and the plunge upon sliding movement of the plunge into the first position.

6. The valve device of claim 1, wherein the dampening mechanism reduces impact noise of the plunge contacting the housing upon sliding movement of the plunge into the first position.

7. The valve device of claim 1, wherein the fluid within the interior area of the housing provides a cushioning effect for reducing impact noise of the plunge with the housing upon sliding movement of the plunge into the first position.

8. The valve device of claim 1, further comprising a spring member in the interior area of the housing between an interior surface of the housing top and the top of the plunge to assist movement of the plunge into the second position.

9. The valve device of claim 1, further comprising a membrane extending between the top of the plunge and an interior surface of the housing.

10. The valve device of claim 1, further comprising a valve on the housing for control of fluid flow to interior area of the housing.

\* \* \* \* \*